July 14, 1970  M. S. DE LAY  3,520,549

STEERING TRANSMISSION FOR AN AUTOMATIC BODY STEERING AXLE

Filed Aug. 12, 1968  4 Sheets-Sheet 1

INVENTOR
MANFORD S. DeLAY
BY
ATTORNEY

INVENTOR
MANFORD S. DeLAY
BY John D. Pope
ATTORNEY

July 14, 1970　　　　　　M. S. DE LAY　　　　　　3,520,549
STEERING TRANSMISSION FOR AN AUTOMATIC BODY STEERING AXLE
Filed Aug. 12, 1968　　　　　　　　　　　　4 Sheets-Sheet 3
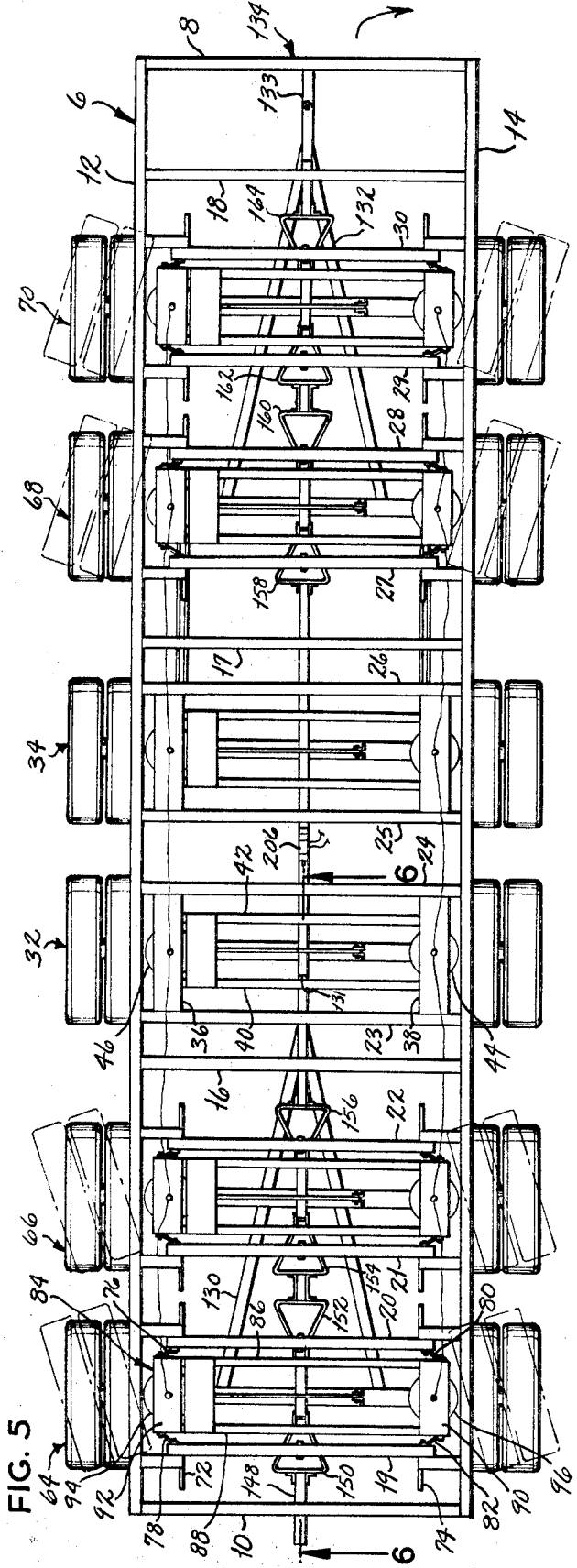
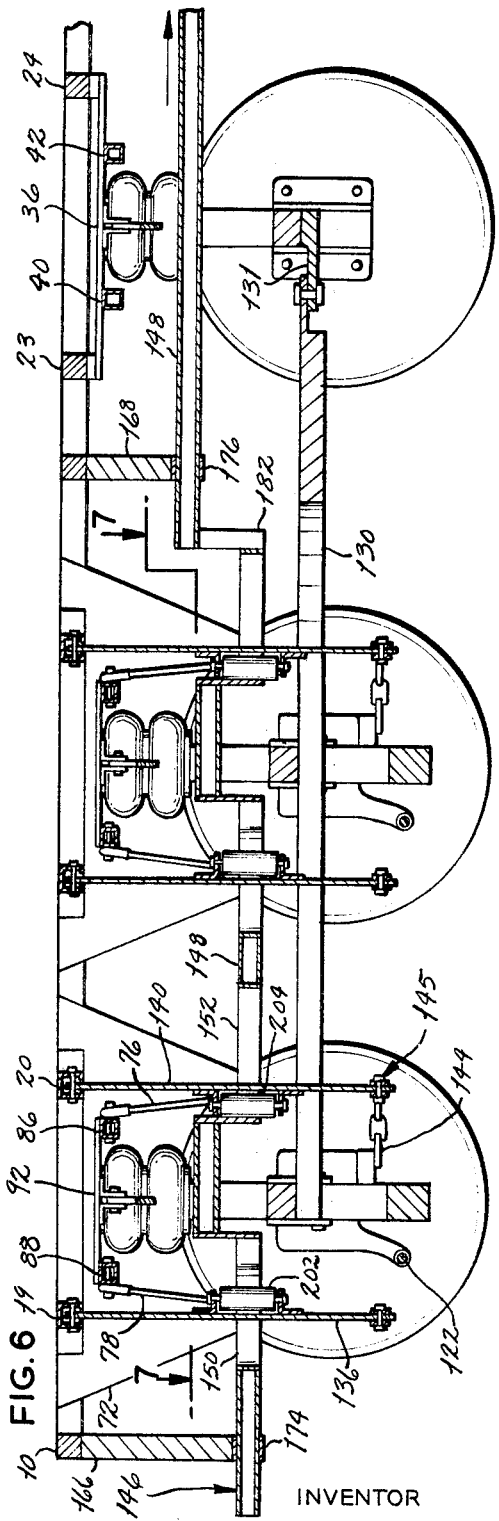
INVENTOR
MANFORD S. DeLAY
BY
ATTORNEY July 14, 1970   M. S. DE LAY   3,520,549

STEERING TRANSMISSION FOR AN AUTOMATIC BODY STEERING AXLE

Filed Aug. 12, 1968   4 Sheets-Sheet 4

INVENTOR
MANFORD S. DeLAY
BY
ATTORNEY

United States Patent Office 3,520,549
Patented July 14, 1970

3,520,549
STEERING TRANSMISSION FOR AN AUTOMATIC BODY STEERING AXLE
Manford S. De Lay, 414 N. Pine, Republic, Mo. 65738
Filed Aug. 12, 1968, Ser. No. 751,798
Int. Cl. B62d 13/06
U.S. Cl. 280—81    12 Claims

ABSTRACT OF THE DISCLOSURE

A steering mechanism is provided for an automatic body steering axle assembly which has a load-carrying frame mounted above a steerably movable wheel assembly. The transmission is used for transferring the steering control from a steering arm forward of the turning axis of the wheels to a steering arm rearward of the turning axis of the wheels. It includes a locking means slidably mounted under the load-carrying frame and interconnecting the forward steering arm and the rearward steering arm. The locking means is movable from a forward position holding the forward steering arm against lateral movement with respect to the frame and allowing the rearward steering arm to move freely with respect to the frame to a rearward position holding the rearward steering arm against lateral movement with respect to the frame and allowing the forward steering arm to move freely with respect to the frame.

---

This invention relates to vehicular trailers having automatic body steering axles and, more particularly, to a steering transmission for shifting the steering control of each axle forwardly and rearwardly of the turning axis of the wheels on such axle.

In my previously issued Pat. No. 3,291,503 issued Dec. 13, 1966, I described an automatically steerable trailer which includes a series of independently steerable axles under one load-carrying frame. When the vehicle is moving forwardly it is necessary for the steering control to be forwardly of each axle in order to produce satisfactory automatic steering. It is also necessary when the vehicle is moving rearwardly for the steering control to be rearwardly of each individual steering axle in order to produce satisfactory automatic steering. My previous patent illustrates the use of a system of hydraulic cylinders and rods for shifting the steering control for forward and rearward movement of the vehicle. However, because this system of hydraulic cylinders and rods is not as advantageous from the viewpoint of simplicity and economic manufacture as could be wished, it has become desirable to provide a better transmission means for shifting the aforementioned control.

Among the objects of the present invention are the provision of a steering mechanism for an automatically steerable trailer which can shift the steering control with respect to each axle so that the axle may be steered automatically during both forward and rearward movement of the vehicle; the provision of a steering transmission which is comprised of a minimum number of moving parts; the provision of a steering transmission which is of sturdy construction; and the provision of a steering transmission which is economical to manufacture. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is an elevational view of a semi tractor and trailer utilizing the steering transmission for a series of automatic steering axles;

FIGS. 2, 3, 4, and 5, are sectional views taken along lines 2—2, 3—3, 4—4, and 5—5, respectively, of FIG. 1;

FIG. 6 is a sectional view taken along line 6—6 of FIG. 5;

Corresponding reference characters indicate corresponding parts throughout the several views of the drawings.

Figure 1:
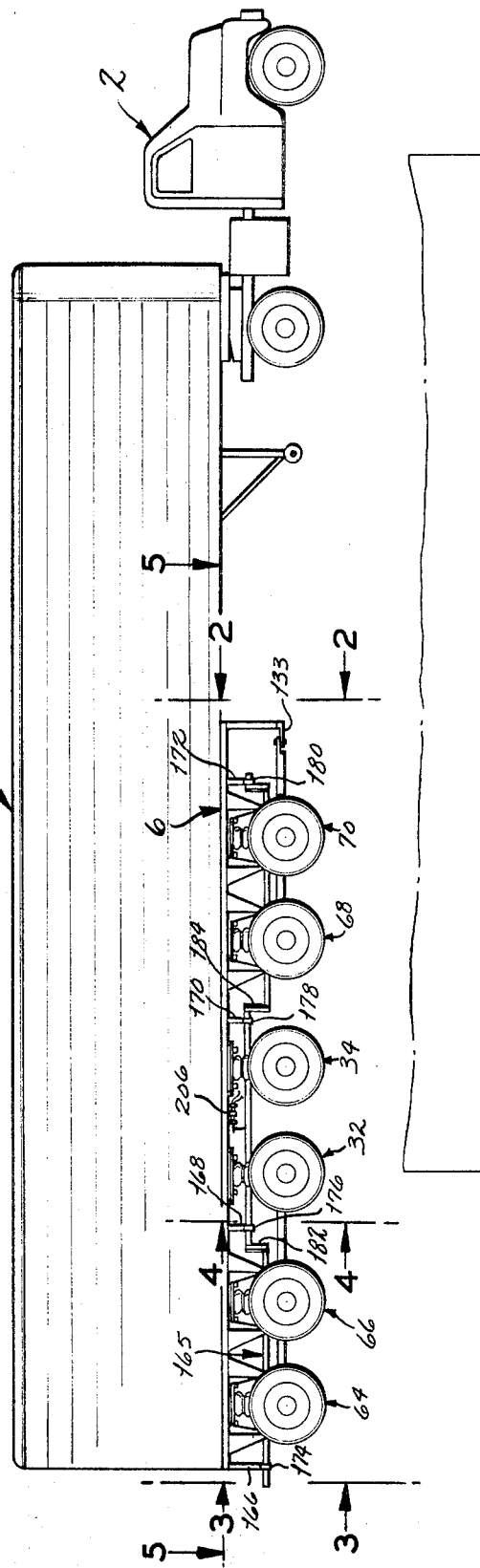
Figure 2:
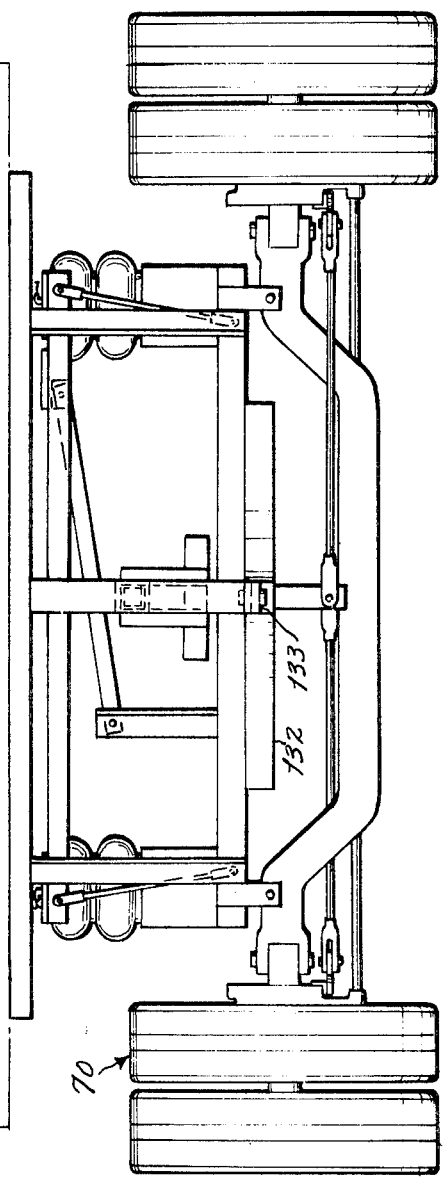
Figure 3:
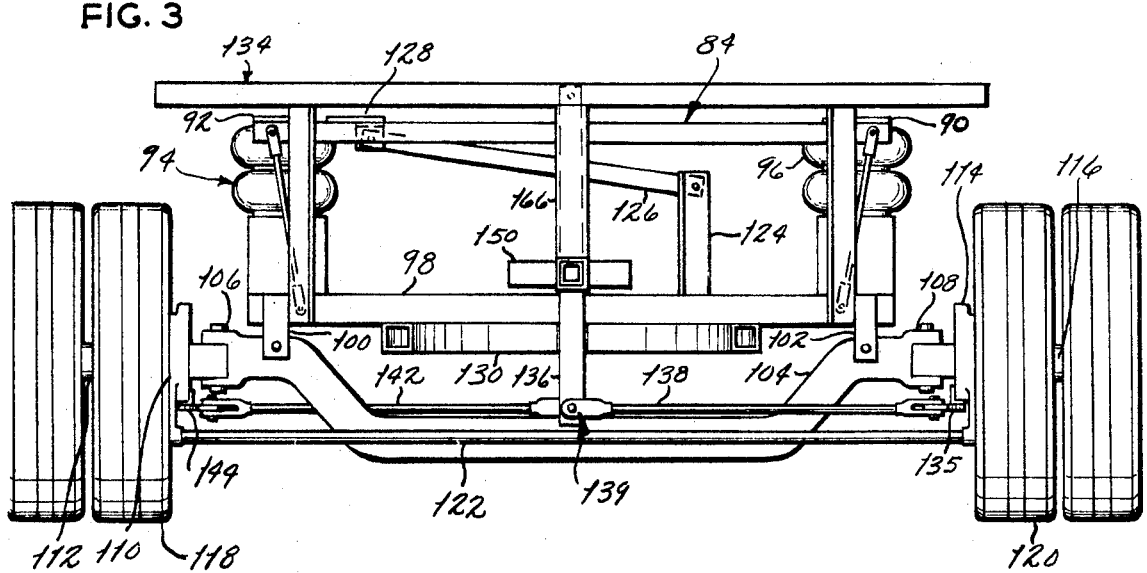
Figure 4:
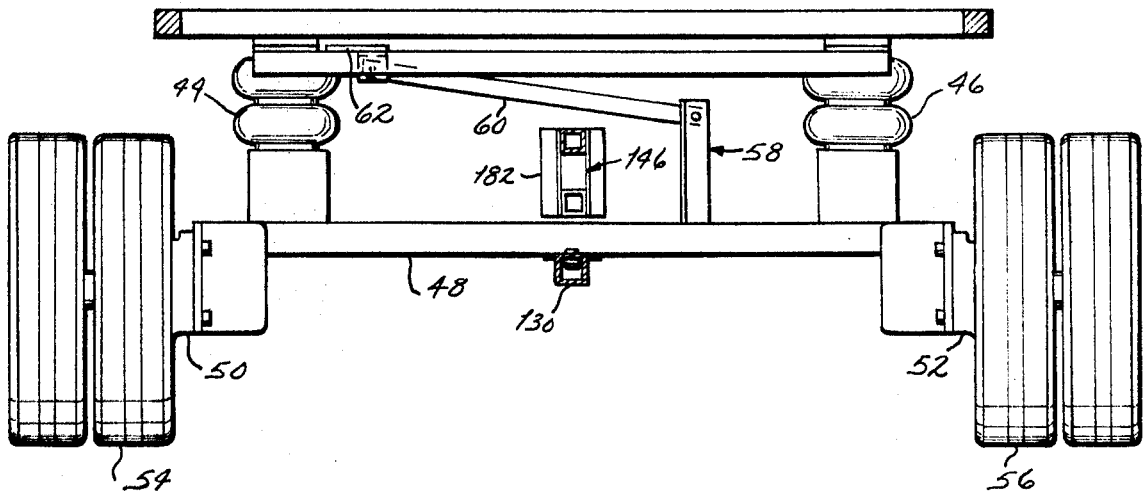

Referring now to the drawings, 2 generally designates a principal vehicle for pulling a vehicular trailer 4. Vehicular trailer 4 is mounted upon load-carrying frame 6 which comprises forward and rearward frame members 8, 10, and side frame members 12, 14. Cross-frame members 16, 17, and 18, provide the frame with further strength. Load-carrying frame 6 is also equipped with cross-member pairs 19 and 20, 21 and 22, 23 and 24, 25 and 26, 27 and 28, and 29 and 30.

Numerals 32, 34, generally designate non-turnable wheel assemblies. Because their construction is identical, the following description of wheel assembly 32 may also be considered the same for wheel assembly 34. Horizontal frame plates 36, 38, are rigidly secured adjacent to the opposite ends of cross-member pairs 23, 24, of load-carrying frame 6. Rigidly secured to the undersurfaces of frame plates 36, 38, and running therebetween parallel to cross-member pairs 23, 24, are cross-supports 40, 42. Suspended from a point midway between the forward and rearward ends of frame plate 36 and rigidly secured thereto is a conventional spring assembly 44. Likewise, a spring assembly 46 is suspended from frame plate 38. Interconnecting the lower ends of spring assemblies 44, 46, is a non-steerable axle 48. Secured to the opposite ends of non-steerable axle 48 are axle spindles 50, 52, upon which are rotatably mounted wheels 54, 56. Extending vertically from axle 48 is a stub 58. A rocker arm 60 is pivotally connected at one of its ends to the upper end of stub 58 and at the other of its ends to rocker arm plate 62 which is rigidly secured to cross-supports 40, 42. Rocker arm plate 62 is located adjacent spring assembly 44 and stub 58 is located adjacent to spring assembly 46. The construction of wheel assembly 32 as herein described permits wheels 54, 56, to move vertically with respect to frame 6 by compressing and decompressing springs 44, 46, but these wheels are held against lateral movement with respect to frame 6 by rocker arm 60.

Numerals 64, 66, generally designate two steerable wheel assemblies located rearwardly of non-steerable wheel assemblies 32, 34, and numerals 68, 70, generally designate two steerable wheel assemblies located forwardly of wheel assemblies 32, 34. The following description of wheel assembly 64 is applicable to wheel assemblies 66, 68, 70, because the four assemblies are identical in construction. Frame legs 72, 74, are rigidly secured at their upper ends to cross-member pairs 19, 20, of frame 6. Frame legs 72, 74, are vertically disposed and are adjacent and parallel to side frame members 12, 14, respectively. A forward swing link 76 and a rearward swing link 78 are pivotally secured to the forward and rearward lower edges of leg 72 and extend upwardly and inwardly therefrom. Likewise, a forward swing link 80 and a rearward swing link 82 are pivotally secured to the lower edges of leg 74 and extend upwardly and inwardly therefrom. A rectangular hanger frame 84 having cross-members 86, 88, and end plates 90, 92, is pivotally secured at its four corners to the upper ends of swing links 76, 78, 80, 82. The pivotal connections of the four swing links at their lower ends to frame legs 72, 74, and at their upper ends to hanger frame 84 allow hanger frame 84 to swing laterally with respect to load-carrying frame 6. Extending downwardly from end plate 92 of hanger frame 84 is a spring assembly 94 and extending downwardly from end plate 90 is a spring assembly 96. Interconnecting the lower ends of springs 94, 96, is an axle beam 98 which is rigidly secured at its opposite ends by securing means 100, 102, to an underslung steering axle 104. While underslung axle 104 is illustrated as being of drop-center construction, any conventional type of steering axle will suffice. A straight steering axle works equally as well as the one of drop-center construction. The opposite ends of underslung steering axle 104 are equipped with hinge means 106, 108, which are located substantially under spring assemblies 94, 96, respectively. Pivotally secured to hinge means 106 is a turning knuckle 110 which has a wheel spindle 112 extending horizontally outwardly therefrom. The pivotal axis between turning knuckle 110 and hinge means 106 is vertically disposed. Hinge means 108 at the opposite end of steering axle 104 is likewise pivotally secured to turning knuckle 114 which has a horizontal wheel spindle 116 extending outwardly therefrom. Rotatably mounted upon wheel spindles 112, 116, are wheels 118, 120. A tie-rod 122 is pivotally secured at its opposite ends to turning knuckles 110, 114. Tie-rod 122 causes turning knuckles 110, 114, to be linked together so that they turn simultaneously about hinge means 106, 108.

Extending upwardly from axle beam 98 is a stub 124. A rocker arm 126 is pivotally secured at one of its ends to stub 124 and at its opposite end to a rocker plate 128 which is rigidly secured to hanger frame 84. Wheels 118, 120, are permitted to spring vertically upward and downward with respect to hanger frame 84 due to the pivotal connections of rocker arm 126 and spring assemblies 94, 96. Rocker arm 126 further serves to hold axle beam 98 and wheels 118, 120, against forward or rearward movement with respect to hanger frame 84.

Extending forwardly from axle beam 98 and rigidly secured thereto is a triangular tongue frame 130 which is pivotally secured at its forward end to non-steerable axle 48 of non-turnable wheel assembly 32 by means of a rear hitch 131. Rear tongue frame 130 is also rigidly secured to the axle beam of wheel assembly 66 which is immediately in front of wheel assembly 64. Wheel assemblies 68 and 70 are secured together by a forward triangular tongue 132 in the same fashion as are wheel assemblies 64, 66. Tongue 132 is pivotally mounted at its apex to forward hitch 133 which is rigidly mounted to frame 6. The combination of frame 6 and the wheel assemblies 64, 66, 32, 34, 68, 70, mounted therebelow may generally be referred to as a body steering axle assembly 134.

Extending rearwardly from and rigidly secured to turning knuckle 114 is a rear steering stem 135. A rear steering arm 136 is pivotally secured at its upper end to cross-member 19 of frame 6 so that it will swing about an axis parallel to the longitudinal axis of frame 6. The lower end of rear steering arm 136 is connected to read steering stem 135 by means of a rear steering link 138. The end of rear steering arm 136 is connected to rear steering arm 136 runs parallel to the longitudinal axis of frame 6. The pivotal axis between rear steering link 138 and rear steering stem 135 is vertically disposed. Therefore, as the lower end of rear steering arm 136 moves laterally with respect to wheels 118, 120, it pulls steering stem 135 and thereby causes wheels 118, 120, to turn on hinges 106 and 108. Rear steering stem 135, arm 136, and link 138 may be collectively referred to as a rear steering connection 139. A forward steering arm 140 is pivotally connected at its upper end to cross-member 20 of frame 6 and at its lower end to a forward steering link 142 which is, in turn, pivotally connected to the forward end of forward steering stem 144 extending forwardly from turning knuckle 110. Forward steering arm 140, link 142, and stem 144 may be collectively referred to as a forward steering connection 145. It should be noted that forward steering arm 140 is located forwardly of the turning axis at hinge means 108, 106, and the rearward steering arm 136 is located rearwardly of these axes. Thus, lateral movement of forward steering arm 140 causes steering control to emanate from in front of the turning axis of the wheels and lateral movement of rear steering arm 136 causes steering control to emanate from behind the turning axis of the wheels.

Numeral 146 generally designates the steering transmission assembly. Steering transmission assembly 146 is comprised of a plurality of shaft segments designated by numeral 148. Between shaft segments 148 are mounted four pairs of triangularly shaped transmission yokes 150 and 152, 154 and 156, 158 and 160, and 162 and 164. These yokes and shaft segments are rigidly secured together and may be referred to collectively as locking means 165. Transmission assembly 146 is suspended from load-carrying frame 6 by means of brackets 166, 168, 170, 172 (FIG. 1), which extend vertically downward from frame 6 and which have collars 174, 176, 178, 180, at their respective lower ends for slidably receiving transmission shaft segments 148. Transmission assembly 146 is thus suspended below frame 6 along a line which is parallel to and equidistant between side members 12, 14, of frame 6.

Stop shanks 182, 184 are located along shaft 148 adjacent brackets 168, 170 to limit the horizontal sliding motion of shaft 148 within collars 174, 176, 178, 180. Transmission yokes 150, 152 are positioned along shaft 148 so as to enclose vertically disposed rear steering arm 136 and forward steering arm 140 respectively. The following description of transmission yokes 150, 152 and their relationship to wheel assembly 64 is identical for wheel assemblies 66, 68, 70. Yoke 150 is comprised of a base 186, sides 188, 190, and a U-shaped locking slot 192 located at the apex of transmission yoke 150.

Figure 7:
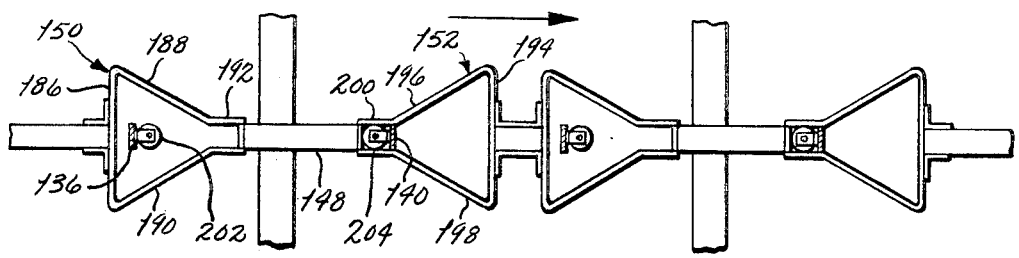
FIG. 7 is a sectional view taken along line 7—7 of FIG. 6 showing the transmission in a forward position for forward movement of the vehicle.

Referring to FIG. 7, yoke 152 is likewise comprised of a base 194, sides 196, 198, and a locking slot 200. Yokes 150, 152 are interconnected by shaft segment 148 with their respective triangular apexes with locking slots 192, 200 mounted therein pointing towards each other. The distance between locking slots 192, 200 is substantially less than the distance between steering arms 136, 140. Steering arm 136 extends downwardly through yoke 152 and has a bearing 202 mounted thereon and facing locking slot 192. Bearing 202 pivots about a vertical axis and is sufficiently large in diameter to protect steering arm 136 against engagement with the inner surfaces of yoke 150. It therefore rolls along these inner surfaces as arm 136 moves within yoke 150. Steering arm 140 also has a bearing 204 facing slot 200 and adapted to bear against the inner surfaces of yoke 152. Because transmission assembly 146 is slidable with respect to frame 6, it is possible to slide yokes 150, 152 forwardly and rearwardly with respect to steering arms 136, 140.

Figure 9:
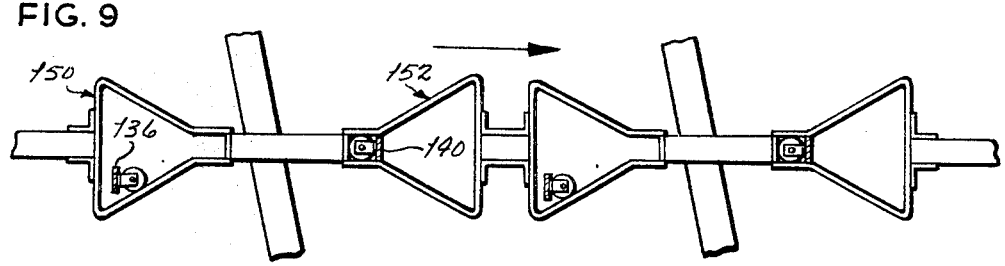
FIG. 9 is a view similar to that of FIG. 7 illustrating the position of the transmission parts when the transmission is in a forward position and the wheels are in a partially turned position.
Figure 10:
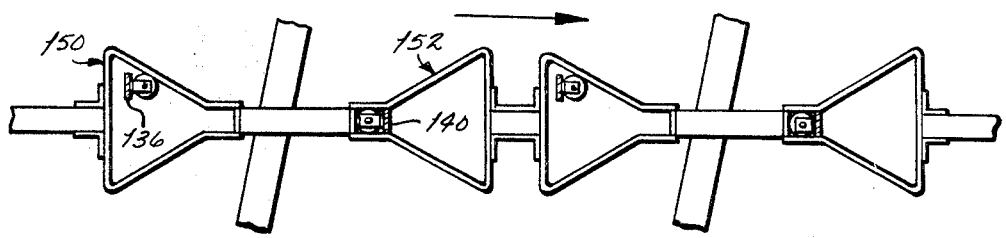
FIG. 10 is a view similar to that of FIG. 7 illustrating the position of the parts when the transmission is in a forward position and the wheels are turned oppositely from those in FIG. 9.

Referring to FIGS. 7, 9, and 10, transmission assembly 146 is shown in its extreme forward position. In this position, yoke 152 receives bearing 204 and forward steering arm 140 within slot 200, thereby preventing steering arm 140 from swinging laterally about its pivotal connection with frame 6. It will be noted, however, that steering arm 136 is not enclosed within slot 192 of yoke 150 and, therefore, it is able to move laterally and longitudinally about its pivotal connection with frame 6.

Figure 8:
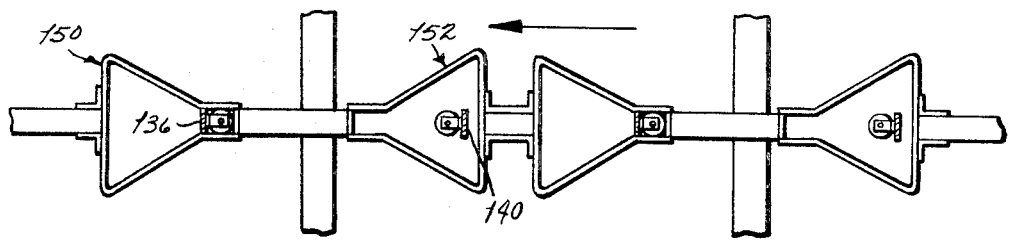
FIG. 8 is a view similar to that of FIG. 7 illustrating the position of the parts when the transmission is in a rearward position for rearward movement of the vehicle.

Referring to FIG. 8, which illustrates transmission assembly 146 in an extreme rearward position, it can be seen that rear steering arm 136 is enclosed within locking slot 192 and forward steering arm 140 is free to move laterally and longitudinally with respect to frame 6.

Transmission assembly 146 is connected to a solenoid 206 which, in turn, is connected to conventional actuating means within vehicle 2. Solenoid 206 serves to move transmission assembly 146 between a forward and a rearward position. Solenoid 206 does not comprise part of this invention and any conventional device may be used for sliding transmission assembly 146. For example, hydraulic cylinders or electric motors may be used.

The method of operation is as follows: When it is desired to go in a forward direction with vehicle 2, solenoid 206 is activated to move transmission assembly 146 to a forward position, thereby locking all the forward steering arms of wheel assemblies 64, 66, 68, 70 against lateral movement with respect to frame 6. When the transmission assembly is in this forward position, the rearward steering arms of wheel assemblies 64, 66, 68, 70 are left free to move laterally and longitudinally with respect to frame 6.

When vehicle 2 turns to the right as illustrated by the arrow in FIG. 5, it causes frame 6 to pivot clockwise about non-turnable wheel assemblies 32, 34 with their respective wheel tracking differentially around the corner. However, the forward steering arms of wheel assemblies 68, 70 are pulled to the right by frame 6 and the forward steering arms of wheel assemblies 64, 66 are pulled to the left by frame 6 as it pivots about wheel assemblies 32 and 34. Except for the fact that wheel assemblies 64, 66 turn in opposite directions from wheel assemblies 68, 70, these four steerable wheel assemblies operate in exactly the same manner.

With respect to wheel assembly 64, the turning of vehicle 2 to the right causes the portion of frame 6 above wheel assembly 64 to move left. However, because wheels 118, 120 engage the ground they do not naturally move to the left in conjunction with frame 6. Thus, frame 6 swings to the left with respect to wheels 118, 120. Steering arm 140, being held rigid with respect to frame 6 by locking slot 200, pushes the forward end of forward steering stem 144 to the left with respect to wheels 116, 118, thereby causing forward steering stem 144 to act as a lever arm to turn wheels 116, 118 about hinge means 106, 108. As a result, wheels 116, 118 turn to the left and the wheel assembly 64 begins to swing back under frame 6. Gravity causes wheel assembly 64 to tend to stay directly under frame 6 because of its swinging suspension under frame 6. Thus, as the pulling vehicle completes the turn and straightens out, gravity causes wheel assembly 64 to again become centered under frame 6. During the time that wheels 118, 120 are turning left, rearward steering arm 136 is free to swing with its bearing 202 rolling along the inside surface of side 190 of yoke 150. Thus, it can be seen that the forward position of transmission assembly 146 causes the steering control to be transferred to wheels 118, 120 by means of forward steering arm 140.

When it is desired to move vehicle 2 in a rearward direction, solenoid 206 is again activated to move transmission assembly 146 to its extreme rearward position, thereby releasing forward steering arm 140 from slot 200 and locking rear steering arm 136 within slot 150. Thus, it can be seen that the steering control to be imparted to wheels 118, 120 has now been transferred from forward steering arm 140 to rearward steering arm 136. It is advantageous to transfer the steering control from the forward steering arm of each wheel assembly to the rear steering arm of each wheel assembly because the steering control of each wheel assembly must be in front of the turning axis of the wheels when the vehicle is going forwardly and behind the turning axis of the wheels when the vehicle is moving rearwardly.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A steering transmission for an automatic body steering axle assembly, said body steering assembly including a load-carrying frame mounted above a steerable wheel assembly by mounting means which permit said frame to move laterally with respect to said wheel assembly, comprising, first and second steering connections each movably secured at one of its ends to said load-carrying frame and at the other of its ends to said steerable wheel assembly; and locking means movably mounted to said load-carrying frame and interconnecting said first and second steering connections, said locking means being movable from a forward position holding said first steering connection against lateral movement with respect to said load-carrying frame and allowing said second steering connection to move freely with respect to said frame to a rearward position holding said second steering connection against lateral movement with respect to said frame and allowing said first steering connection to move freely with respect to said frame.

2. The steering transmission of claim 1 wherein said locking means includes a first yoke and a second yoke, a portion of said first steering connection extending through said first yoke and a portion of said second steering connection extending through said second yoke.

3. The steering transmission of claim 2 wherein bearing means are mounted upon said steering connections for bearing against the interior surfaces of said yokes.

4. The steering transmission of claim 2 wherein said first and second yokes each contain locking slots for receiving said steering connections to alternatively hold them against lateral movement with respect to said frame, said slot of said first yoke receiving said first steering connection when said locking means is in a forward position and said slot of said second yoke receiving said second steering connection when said locking means is in a rearward position.

5. The steering transmission of claim 4 wherein said locking slots are positioned on said locking means so that the distance between them is less than the distance between said first and second steering connections.

6. The steering transmission of claim 2 wherein said portions of said first and second steering connections are steering arms pivotally connected to said frame.

7. The steering transmission of claim 2 wherein said locking means includes a plurality of shaft segments interconnecting said first and second yokes, said shaft segments and said yoke means being rigidly secured to each other.

8. The steering transmission of claim 2 wherein said locking means is slidably movable longitudinally with respect to said frame from said forward position to said rearward position.

9. The steering transmission of claim 8 wherein stop means are included on said locking means to limit the longitudinal movement of said locking means with respect to said steering connections.

10. The steering transmission of claim 1 wherein said steerable wheels pivot about two vertical axes and said first and second steering connections are respectively positioned forwardly and rearwardly of said axes.

11. The steering transmission of claim 1 wherein mounting means include swing links which are pivotally connected at their upper ends to said steerable wheel assembly and are pivotally connected at their lower ends to said load-carrying frame, said steerable wheel assembly being free to swing on said swing links laterally with respect to said frame, gravity causing said steerable wheel assembly to stay centered below said load-carrying frame.

12. In a body steering axle assembly having a steerable wheel assembly movably mounted below a load-carrying frame by mounting means which allow said steerable wheel assembly to move laterally with respect to said load-carrying frame, the improvement in a steering transmission comprising, first and second steering connections movably mounted at one of their ends to the load-carrying frame and at the other of their ends to the steerable wheel assembly; first and second transmission yokes embracing said first and second steering connections respectively, said first and second transmission yokes being rigidly interconnected and being movable from a first position wherein said first transmission yoke holds said first steering connection against lateral movement with respect to said load-carrying frame to a second position wherein said second transmission yoke holds said second steering connection against lateral movement with respect to said load-carrying frame.

References Cited
UNITED STATES PATENTS

| | | | |
|---|---|---|---|
| 1,380,119 | 5/1921 | Sponsel | 280—99 |
| 1,726,239 | 4/1930 | Chojnacki | 280—448 X |
| 2,154,957 | 4/1939 | Pinard | 280—100 X |
| 2,485,853 | 10/1949 | Willet | 280—444 |
| 2,710,198 | 6/1955 | Hall | 280—445 X |
| 2,733,932 | 2/1956 | Stidam | 280—103 |
| 3,044,795 | 7/1962 | Standing et al. | 280—81 |
| 3,291,503 | 12/1966 | De Lay | 280—81 |
| 3,354,982 | 11/1967 | Schramm | 280—81 |

KENNETH H. BETTS, Primary Examiner

U.S. Cl. X.R.

280—445, 448

UNITED STATES PATENT OFFICE
CERTIFICATE OF CORRECTION

Patent No. 3,520,549          Dated July 14, 1970

Inventor(s)   Manford S. De Lay

It is certified that error appears in the above-identified patent and that said Letters Patent are hereby corrected as shown below:

In the drawings, Sheet 4, Figs. 7-10, the unidentified box-like members crossing the shaft segments 148 should be disregarded.--.

Signed and sealed this 26th day of January 1971.

(SEAL)
Attest:

EDWARD M. FLETCHER, JR.          WILLIAM E. SCHUYLER, JR.
Attesting Officer                Commissioner of Patents